US011998099B2

(12) United States Patent
Litwinowicz et al.

(10) Patent No.: US 11,998,099 B2
(45) Date of Patent: Jun. 4, 2024

(54) HAIR LENGTH HAND GUIDE

(71) Applicants: Anthony Stefan Litwinowicz, Derby, CT (US); Stella Hyowon Litwinowicz, Derby, CT (US)

(72) Inventors: Anthony Stefan Litwinowicz, Derby, CT (US); Stella Hyowon Litwinowicz, Derby, CT (US)

( * ) Notice: Subject to any disclaimer, the term of this patent is extended or adjusted under 35 U.S.C. 154(b) by 686 days.

(21) Appl. No.: 17/114,905

(22) Filed: Dec. 8, 2020

(65) Prior Publication Data

US 2021/0177119 A1 Jun. 17, 2021

Related U.S. Application Data

(60) Provisional application No. 62/948,969, filed on Dec. 17, 2019.

(51) Int. Cl.

| | |
|---|---|
| ***A45D 24/36*** | (2006.01) |
| ***A45D 7/00*** | (2006.01) |
| *B26B 13/00* | (2006.01) |

(52) U.S. Cl.

CPC .............. *A45D 24/36* (2013.01); *A45D 7/00* (2013.01); *A45D 2007/007* (2013.01); *B26B 13/00* (2013.01)

(58) Field of Classification Search

CPC .......... A45D 24/36; A45D 24/38; A45D 7/00; A45D 2007/007; B26B 21/00; B26B 21/12

USPC ........................................................ D28/44.2

See application file for complete search history.

(56) References Cited

U.S. PATENT DOCUMENTS 4,269,205 A * 5/1981 Clark ..................... A45D 24/36 132/213
4,383,374 A * 5/1983 Bertero .................... G01C 9/12 33/373
4,768,528 A * 9/1988 Steele, Jr. .............. A45D 24/36 D28/44.2

* cited by examiner

*Primary Examiner* — Rachel R Steitz

(57) ABSTRACT

The Hair Length Hand Guide allows for the user to easily measure and cut hair at uniform lengths. The guide is mounted between any two fingers on either hand such that the guide support extends perpendicular to the bottom of the hand when the user's fingers are extended straight and the hand is flat. To measure hair, the user can run their fingers at an angle in a combing motion through the hair grasping any that needs to be cut at its base. The curvature on the bottom of the guide support then allows the user to rock their hand back, pulling the hair grasped between their fingers straight while bringing the hand parallel to the cutting surface. The user can then cut any hair that extends beyond the top of their fingers for a uniform cut.

2 Claims, 5 Drawing Sheets

HAIR LENGTH HAND GUIDE

CROSS-REFERENCE TO RELATED APPLICATIONS

This application claims the benefit of U.S. Provisional Application No. 62/948,969, by Litwinowicz, filed on Dec. 17, 2019.

BACKGROUND OF THE INVENTION

Field of the Invention

The present invention relates to hair cutting devices, specifically devices that provide a guide for cutting hair at uniform lengths.

Description of the Related Art

Going to a hairdresser can be expensive and time consuming. For that reason many people are trying to save time and money by cutting hair at home. The problem is that cutting hair to desired length requires a certain skill. A hairdresser cuts longer length hair freehand, pulling the hair to a set distance from the scalp to measure it before cutting. This freehand technique relies on the hairdresser's skill to maintain a consistent length of cut as they move around the head. For anyone unskilled in the art of hairdressing, it is very difficult to judge the same distance at different locations around the head. This is especially difficult if you mean to cut your own hair where you cannot see the back of your head without using mirrors. It is all too common for home barbers to mistakenly cut a lock of hair too short leaving an embarrassing look.

Hair clipper comb attachments such as the "Comb attachment for hair clippers" U.S. Pat. No. 10,377,049, issued to Whittaker, allow for the cutting of hair uniformly, but only allow for cutting hair at short lengths. Such haircuts are usually limited to buzz cuts because of the short length that hair clippers can reliably cut. As a result, many people settle on buzz cuts because it is the only style they can reliably attain at home.

More recent devices such as the "Apparatus For Cutting Hair" U.S. Pat. No. 9,173,469, issued to Zhang, utilize a comb paired with a spine to measure hair length. Devices like this have no way of grasping the hair which may not get picked up by the comb. Additionally, it will only work with certain types of hair. Curly hair or hair that is too rigid or fine may not be picked up by the comb or cut to the correct length.

There are some devices that allow for cutting of medium length hair by securing the hair via suction using a vacuum such as the "Hair clipper" U.S. Pat. No. 4,679,322, issued to Hunts. These devices have several drawbacks in that they are complex, expensive, noisy, cumbersome, and require a vacuum cleaner. This device is also limited because it performs the cutting, leaving no way for the user to soften a haircut through point cutting with scissors.

When it comes to handheld guides that allow a user to cut medium length hair consistently there is some prior art including the "Hair cutting guide" U.S. Pat. No. 2,727,522, issued to Gomme. This guide has a complicated hinge system which can be difficult to control, and can easily pinch and pull out hair.

Another handheld guide is the "Thumb Hair Gauge" U.S. Pat. No. 4,269,205, issued to Clark. This guide is complex with moving pieces that can pinch and pull hair. Additionally this guide is cumbersome to put into place for measuring hair.

Another handheld guide is the "Finger Guide Precision Haircutting tool" U.S. Pat. No. 4,768,528, issued to Steele. In addition to being awkward to use, the length of hair that can be measured with this guide is limited by the distance between the user's thumb and index finger.

None of the existing products on the market provide a simple and cost effective means to enable one who is unskilled in the art of hairdressing to execute a uniform haircut on medium length hair.

What is needed is a simple hair cutting guide that allows the user to grasp hair, pull it straight, and hold it in place for cutting while measuring it at the same time. The guides should be simple to use and avoid complicated parts that can pinch and pull out hairs.

BRIEF SUMMARY OF THE INVENTION

The Hair Length Hand Guide was designed in response to the present state of the art. It provides for an easy way to measure hair length by supporting the user's hand at a set distance from any object the hand is parallel to when the user's fingers are extended such that their hand is flat. The design facilitates the natural combing motion of running one's fingers through hair at an angle, allowing the user to easily grasp the hair that needs to be cut at the base then pull the hair straight while sliding the guide support into place such that their hand is parallel to the head while resting on the guide at the desired distance for cutting.

The Hair Length Hand Guide consists of an elongated guide support with a finger mount on the top end and a smooth convex curve at the bottom end. The guide support is attached to the finger mount such that the guide support extends perpendicular to the bottom of the user's hand when their fingers are extended and the hand is flat. The body of the guide support is flat longitudinally in alignment with the fingers, which allows the guide support to glide through hair. The bottom of the guide support is curved, allowing the user to comfortably roll the guide support from an angled position to a position perpendicular to the haircut recipient's head. The length of the guide support corresponds to the length at which hair is to be cut.

The finger mount in the current invention consists of two platforms spaced to allow for fingers between them. The top platform will rest on the top of any two fingers being used. It keeps the finger guide from falling out of the hand and pulls the guide with the fingers when the user rotates their hand from an angled position relative to the scalp to a position parallel to the scalp. The lower platform rests beneath the two fingers and extends back under the user's palm. The user can rest their hand on this platform when their hand is flat and parallel to the scalp and the bottom rounded end of the guide support is resting on the haircut recipient's head.

The current invention has been designed such that the finger mounts can accommodate many different finger sizes through the use of adjusting pads that can be added or removed from either platform. These pads can be soft to increase comfort when wearing the guide. Other embodiments of this invention include finger mounts that are ring shaped and go around the entire finger. These rings can be adjustable to accommodate varying finger sizes as well.

To facilitate different hair lengths and styles, several hair guides with longer or shorter guide supports can be created for measuring different hair lengths. Other embodiments of this invention include a Hair Length Hand Guide where the guide support is adjustable in length allowing for a single guide to measure a multitude of hair lengths.

The Hair Length Hand Guide has been designed with plastic injection molding in mind. It can easily be 3D printed or moulded from plastics. Embodiments of the present invention include, but are not limited to using components created from plastic, plastic composites, wood, metal, metal composites, glass, carbon fiber, and/or clay.

BRIEF DESCRIPTION OF THE DRAWINGS

These drawings represent a typical embodiment of the invention. They are not drawn to scale and are not intended to limit the scope of the embodiments of this invention. The advantages, and varying embodiments of this invention, will be explained in more specificity through the use of these drawings wherein.

DETAILED DESCRIPTION OF THE INVENTION

A detailed description of one or more embodiments of the disclosed invention are presented herein by way of exemplification and not limitation with reference to the Figures.

Structure

Figure 4:
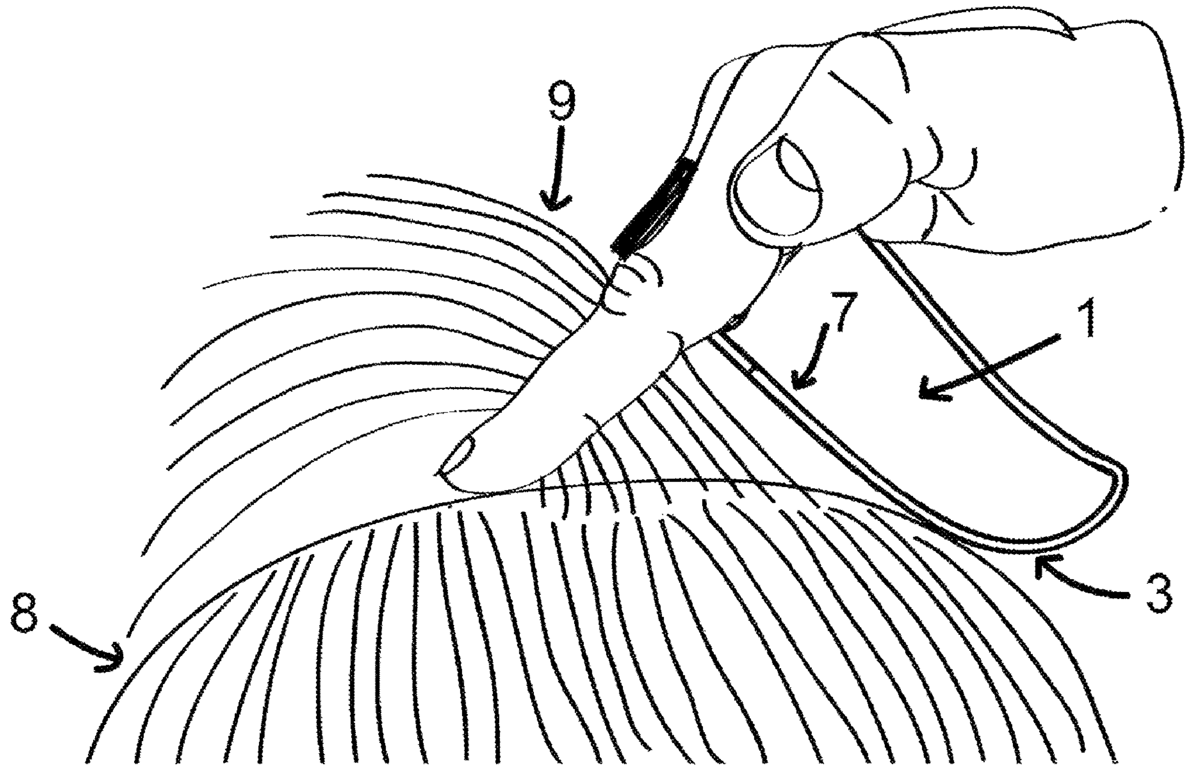
FIG. 4 is a side perspective view of the "Hair Length Hand Guide" according to one embodiment of the present invention in use in a typical manner.
Figure 5:
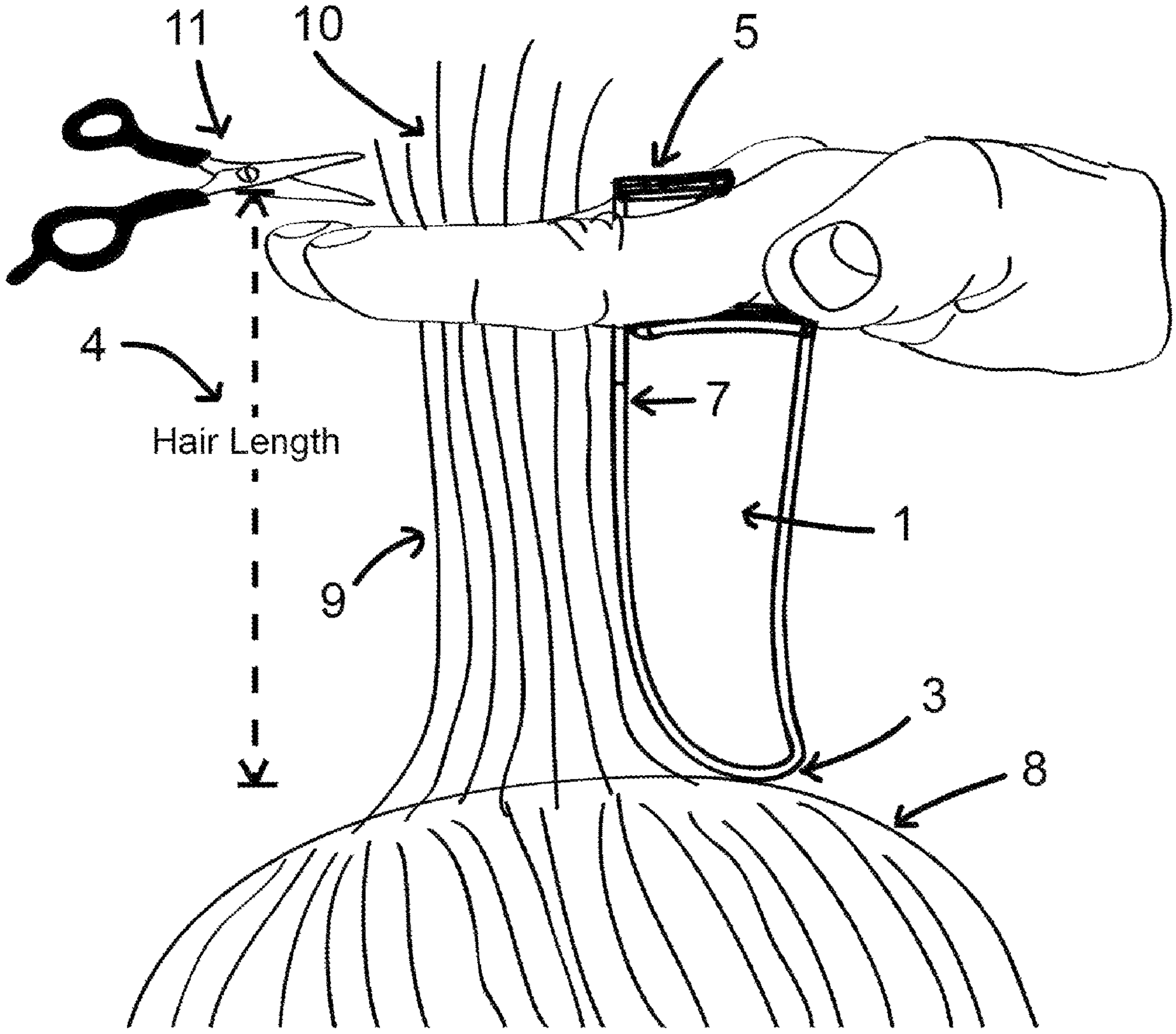
FIG. 5 is a side perspective view of the "Hair Length Hand Guide" according to one embodiment of the present invention in use in a typical manner.

The Hair Length Hand Guide in certain embodiments of the present invention include, but are not limited to an elongated guide support 1 with a finger mount 2 on the top end and a smooth convex curve 3 at the bottom end. The finger mount 2 is positioned such that the guide support 1 is perpendicular to the hand when the user's fingers are extended and the hand is flat. The guide support 1 is flat longitudinally with the fingers, and curved at the bottom in a manner that allows the user to comfortably roll the guide support from an angled position as seen in FIG. 4 to a position perpendicular to the haircut recipient's head as seen in FIG. 5. The height of the guide 4 corresponds to the length of cut desired.

Figure 1:
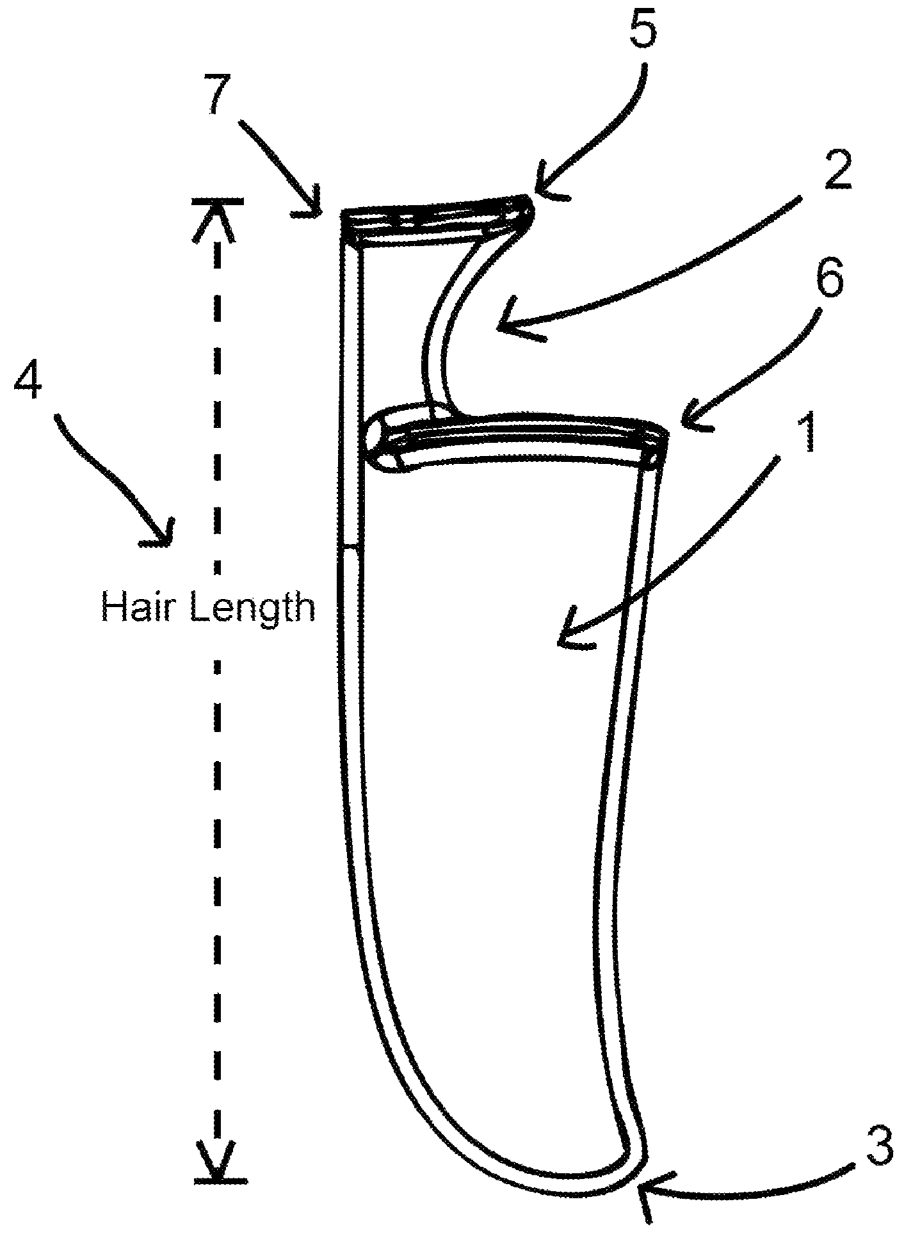
FIG. 1 is a side perspective view of the "Hair Length Hand Guide" according to one embodiment of the present invention.
Figure 2:
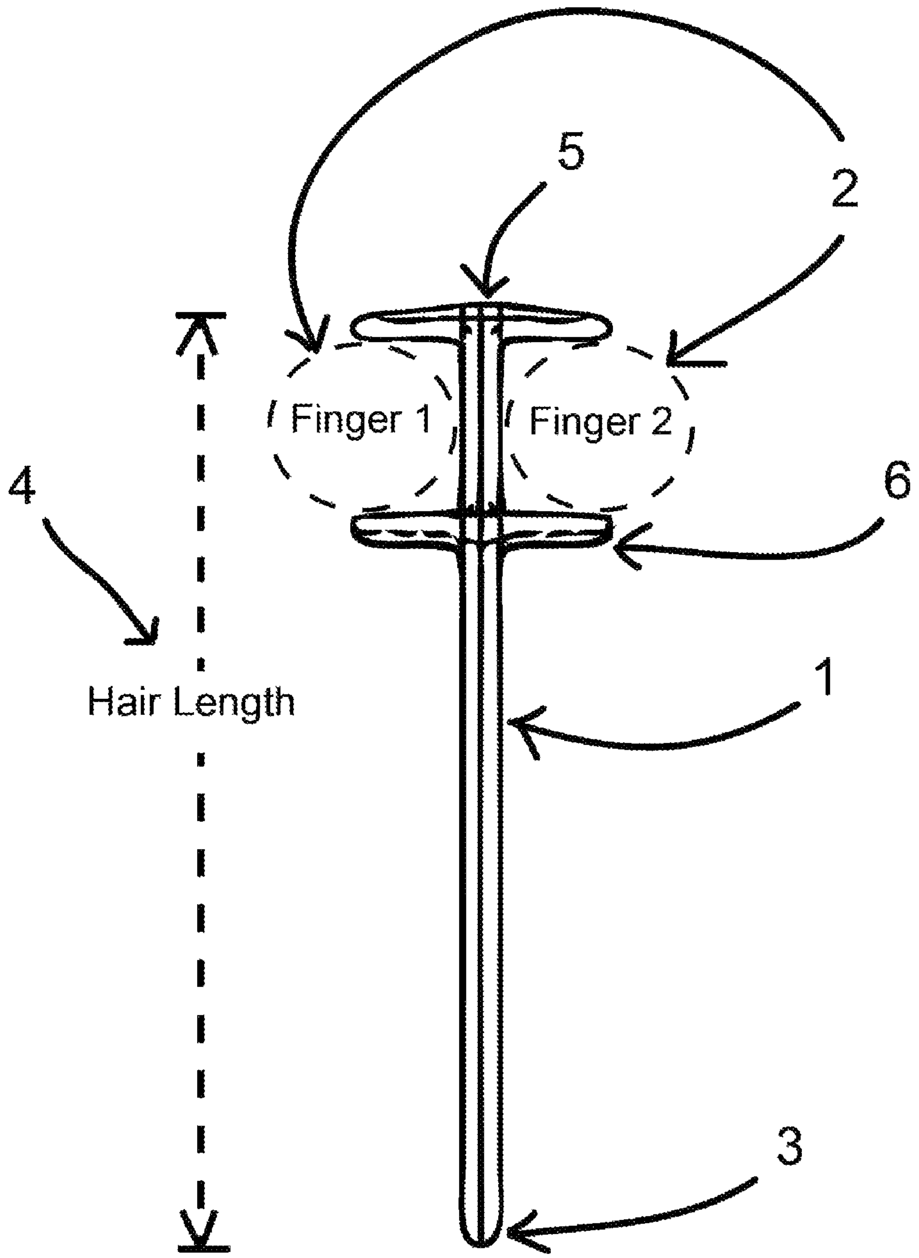
FIG. 2 is a front perspective view of the "Hair Length Hand Guide" according to one embodiment of the present invention.
Figure 3:
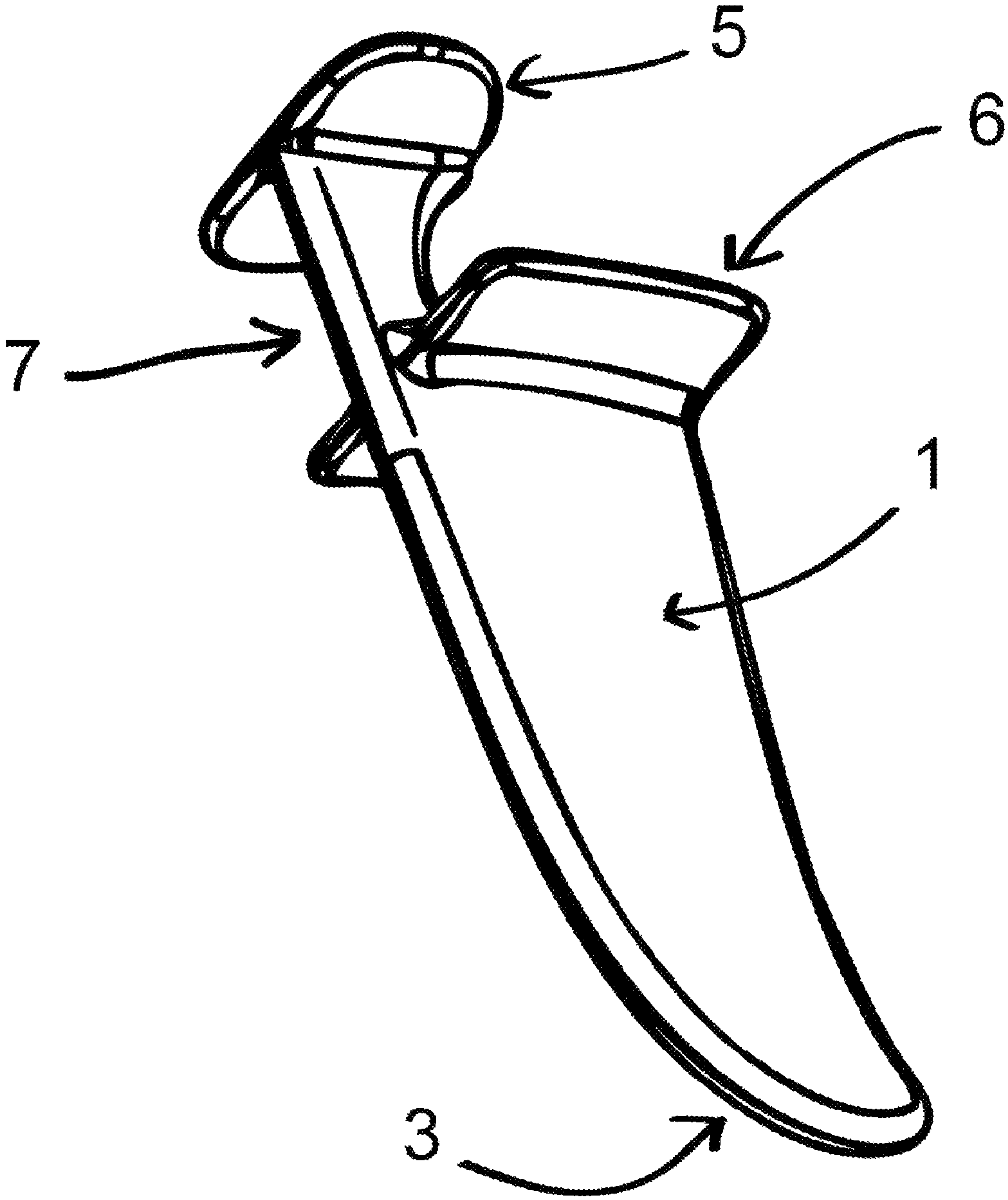
FIG. 3 is a perspective view of the "Hair Length Hand Guide" according to one embodiment of the present invention.

The finger mount 2 in certain embodiments of the present invention include, but are not limited to two platforms spaced to allow for any two adjacent fingers on either hand to be mounted between as seen in FIG. 2. When properly mounted, the top platform 5 rests on the top of the two fingers being used. The top platform 5 keeps the guide from falling out of the hand and pulls the guide along with the fingers when the user rotates their hand or fingers from an angled position relative to the scalp as seen in FIG. 4 to a position parallel to the scalp as seen in FIG. 5. The top platform 5 can also be shaped in a manner to provide protection to the fingers from any cutting device. The lower platform 6 sits beneath the two fingers and extends back under the user's palm. The user can rest their hand on the lower platform 6 when the user's hand is extended parallel to the scalp such that the hand is flat and the rounded end of the guide 3 is resting on the head as seen in FIG. 5.

Certain embodiments of the present invention include, but are not limited to finger mounts 2 that can accommodate different finger sizes through the use of adjusting pads that can be added or removed from either the bottom of the top platform 5 or to the top of the bottom platform 6. These pads can be soft to increase the comfort when wearing the guide.

Other embodiments of this invention include, but are not limited to, finger mounts 2 that are ring shaped and go around the entire finger. These rings can be adjustable to accommodate varying finger sizes.

To facilitate different hair lengths and styles, certain embodiments of the present invention include, but are not limited to creating several hair guides with guide supports 1 that are longer or shorter in length 4 to accommodate different hair lengths. Other embodiments of this invention include, but are not limited to, a Hair Length Hand Guide where in the guide support 1 is adjustable in length allowing for a single guide to measure a multitude of hair lengths.

Other embodiments of this invention include, but are not limited to, leveling sensors attached to the guide body 1 in the pitching, rolling, or yawing axes. Such sensors could assist in different types of haircuts.

Certain embodiments of the present invention include, but are not limited to, a design that can be 3D printed or moulded from plastics. Embodiments of the present invention include, but are not limited to using components created from plastic, plastic composites, wood, metal, metal composites, glass, carbon fiber, and/or clay.

Operation

The Hair Length Hand Guide can be mounted by sliding any two adjacent fingers of either hand into the finger mounts 2. The typical position to mount the guide would be between the index and middle fingers. Depending on the user's preference, the guide can also be mounted between the middle finger and the ring finger, or between the ring finger and pinky finger. The guide should be mounted such that the guide support 1 is extending below the hand, with the front of the guide 7 facing towards the tips of the fingers, and the lower platform 6 extending under the palm of the hand as shown in FIG. 5.

With the Hair Length Hand Guide it is possible to secure and measure most hair with just one hand. With the guide mounted, the user can run their fingers at an angle to the haircut recipient's scalp 8 in a combing motion to secure the section of hair 9 that needs to be cut between their fingers as shown in FIG. 4. Once the hair 9 is secured between the fingers, the user can rock their hand back while extending their finger straight and sliding the bottom of the guide 3 to a position where the guide support 1 extends perpendicular to the haircut recipient's scalp 8 while pulling the hair to be cut 9 taut as shown in FIG. 5. For extra thick or curly hair, the user can use one hand to pull the hair to be cut 9 taut then position the hair between the fingers of the hand with the Hair Length Hand Guide mounted in a position perpendicular to the haircut recipient's scalp 8 as shown in FIG. 5.

Once the Hair Length Hand guide is in the correct position with the guide support perpendicular to the haircut recipient's scalp 8, any hair to be cut 9 that extends above the fingers 10 is longer than the desired cut length 4 and can be trimmed. The hair can be trimmed using a set of scissors 11, or a buzzer, trimmer, etc. Using a pair of barber's scissors 11, the user can trim the hair straight across, or one can utilize point cutting to soften the haircut.

The invention claimed is:

1. A hair length hand guide comprising:

a. a finger mount adapted to be secured from above, below and in between the base of two adjacent fingers to provide stability relative to the user's hand in lateral, longitudinal, and yawing axes when the user's fingers are together and extended such that the hand is flat;

said finger mount comprising:

i. a first finger receiving portion; and ii. a second finger receiving portion;

iii. a top horizontal platform attached to a top of the finger mount having a first depth to secure the first and second finger receiving portions from above; and iv. a bottom horizontal platform attached to a bottom of the finger mount having a second depth to secure the first and second finger receiving portions from below;

V. the second depth of the bottom horizontal platform is greater than the first depth of the top horizontal platform, extending further back than the top horizontal platform to provide additional stability under the palm of the user's hand when the guide is mounted;

b. a guide support, whose length determines the length of the hair to be cut, that projects down from the bottom of the finger mount such that it extends perpendicular below the bottom horizontal platform when the hand guide is mounted wherein the user's fingers are extended such that the hand is flat.

2. The hair length hand guide of claim 1, wherein the guide support is flat in a longitudinal direction so that it can flow through hair, and having a bottom surface that is curved allowing the user to roll the guide support from an angled position to a position perpendicular to the recipient's head.

* * * * *